(12) United States Patent
Hoysan et al.

(10) Patent No.: US 8,033,137 B2
(45) Date of Patent: Oct. 11, 2011

(54) PROCESS TO PRESERVE ISOPIPE DURING COUPLING

(75) Inventors: Steven F Hoysan, Cypress, TX (US); Steven Michael Milillo, State College, PA (US); William Robert Powell, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 898 days.

(21) Appl. No.: 12/069,333

(22) Filed: Feb. 8, 2008

(65) Prior Publication Data

US 2008/0202165 A1 Aug. 28, 2008

Related U.S. Application Data

(60) Provisional application No. 60/902,666, filed on Feb. 22, 2007.

(51) Int. Cl.
*C03B 17/00* (2006.01)
*C03B 17/06* (2006.01)

(52) U.S. Cl. ............... 65/90; 65/53; 65/99.1; 65/195

(58) Field of Classification Search ............... 65/121, 65/53, 195, 98, 90, 99.1
See application file for complete search history.

(56) References Cited

U.S. PATENT DOCUMENTS

| | | | |
|---|---|---|---|
| 3,437,470 A * | 4/1969 | Overman | 65/195 |
| 3,519,411 A * | 7/1970 | Cortright et al. | 65/90 |
| 7,681,414 B2 * | 3/2010 | Pitbladdo | 65/193 |
| 2003/0121287 A1 * | 7/2003 | Chalk et al. | 65/90 |
| 2005/0138966 A1 | 6/2005 | Pitbladdo | 65/29.21 |
| 2008/0282736 A1 * | 11/2008 | Filippov et al. | 65/90 |

* cited by examiner

*Primary Examiner* — Jason L. Lazorcik
(74) *Attorney, Agent, or Firm* — Siwen Chen

(57) ABSTRACT

Methods for reducing stress on an isopipe during manufacture of a drawn glass sheet are disclosed including a method comprising providing an isopipe having a root, heating the isopipe to a predetermined temperature, maintaining the isopipe at the predetermined temperature for a period of time sufficient to relieve at least a portion of a tensile stress on the isopipe root, coupling the isopipe to a down-comer, and then providing glass to the isopipe. Also disclosed is a method comprising heating an isopipe such that the temperature difference between the weir and the root of the isopipe, after heating and prior to coupling, is less than about 100° C. A method comprising application of a compressive force to the ends of an isopipe root during heating is also disclosed.

18 Claims, 6 Drawing Sheets

PROCESS TO PRESERVE ISOPIPE DURING COUPLING

CROSS-REFERENCED TO RELATED APPLICATIONS

This application claims the benefit of priority under 35 U.S.C. §119(e) of U.S. Provisional Application Ser. No. 60/902,666 filed on Feb. 22, 2007.

BACKGROUND

1. Field

The present invention relates to apparatuses and methods used in the manufacture of sheet glass by the fusion process.

2. Technical Background

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a supply pipe, known as an isopipe, which provides molten glass to a collection trough formed in a refractory body. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is located well downstream of the root so that the single sheet has cooled and become rigid before coming into contact with the equipment.

The outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

The dimensional stability of an isopipe during the glass forming process can affect the overall success of the manufacturing process, as well as the properties of the manufactured glass sheet. In the overflow downdraw fusion process, an isopipe can be subjected to temperatures of about 1,000° C. While exposed to these temperatures, an isopipe must support its own weight, the weight of the molten glass contained within the isopipe and overflowing its sides, and at least some tensional force that is transferred back to the isopipe through the fused glass as it is being drawn.

Commercial and market factors require a continuous increase in the size of light emitting displays and thus, the size of sheet glass. Depending on the width of the sheet glass to be produced, an isopipe can have an unsupported length of about 1.5 meters or more.

To withstand these demanding conditions, isopipes have conventionally been manufactured from isostatically pressed blocks of refractory material (hence the name "isopipe"). In particular, isostatically pressed zircon refractories have been used to form isopipes for the fusion process. Conventional zircon refractories are comprised of $ZrO_2$ and $SiO_2$, or equivalently $ZrSiO_4$, and sintering additives. Even with such high performance materials, isopipe materials can fracture or creep, resulting in dimensional changes which limit their useful life. In particular, isopipes can exhibit sag such that the middle of the unsupported length of the pipe drops below the height of its outer supported ends.

Thus, there is a need to address dimensional stability and other shortcomings associated with conventional isopipes and methods for manufacturing sheet glass. These needs and other needs are satisfied by the composition and methods of the present invention.

SUMMARY

The present invention relates to methods of glass manufacture, and specifically to methods for reducing tensile stress on an isopipe during use. The present invention addresses at least a portion of the problems described above through the use of novel heating and control methods.

In a first aspect, the present invention provides a method for reducing stress on an isopipe during manufacture of a drawn glass sheet, the method comprising:
  a) providing an isopipe having a weir and a root;
  b) heating the isopipe to a predetermined temperature;
  c) maintaining the isopipe at the predetermined temperature for a period of time sufficient to relieve at least a portion of a tensile stress on the isopipe root;
  d) after step c), coupling the isopipe to a down-comer; and
  e) after step d), providing glass to the isopipe.

According to certain embodiments of the first aspect of the present invention, the period of time in step c) is at least about 10 hours. In certain embodiments, the period of time is at least about 20 hours. In certain embodiments, the period of time is at least 30 hours.

According to certain embodiments of the first aspect of the present invention, the tensile stress after the period of time in step c) is less than about 1,000 psi.

According to certain embodiments of the first aspect of the present invention, the tensile stress after the period of time in step c) is at least about 500 psi less than the tensile stress prior to the period of time. In certain embodiments, the tensile stress after the period of time is at least about 800 psi less than the tensile stress prior to the period of time.

According to certain embodiments of the first aspect of the present invention, the predetermined temperature in steps b) and c) is from about 800° C. to about 1,250° C.

According to certain embodiments of the first aspect of the present invention, a compressive force is applied to the isopipe root at least during step b). In certain specific embodiments, after step c) and prior to step d), the weir and the root have a temperature difference of less than about 100° C.

According to certain embodiments of the first aspect of the present invention, a compressive force is applied to the isopipe root at least during step c). In certain specific embodiments, after step c) and prior to step d), the weir and the root have a temperature difference of less than about 100° C.

According to certain embodiments of the first aspect of the present invention, after step c) and prior to step d), the weir and the root have a temperature difference of less than about 100° C.

A second aspect of the present invention is a method for reducing stress on an isopipe during manufacture of a drawn glass sheet, the method comprising:
  a) providing an isopipe having a weir and a root;
  b) heating the isopipe to a predetermined temperature;

c) after step b), coupling the isopipe to a down-comer; and
d) after step c), providing glass to the isopipe;
   i) wherein after heating and prior to coupling, the weir and the root have a temperature difference of less than about 100° C.

According to certain embodiments of the second aspect of the present invention, after heating, the weir and the root have a temperature difference of less than about 75° C.

According to certain embodiments of the first aspect of the present invention, a compressive force is applied to the isopipe root at least during step b).

A third aspect of the present invention is a method for reducing stress on an isopipe during manufacture of a drawn glass sheet, the method comprising:
a) providing an isopipe having a root;
b) heating the isopipe to a predetermined temperature;
c) after step b), coupling the isopipe to a down-comer; and
d) after step c), providing glass to the isopipe;
   i) wherein during heating and prior to coupling, a compressive force sufficient to relieve at least a portion of a tensile stress on the isopipe root is applied to the root.

According to certain embodiments of the third aspect of the present invention, the compressive force is at least about 1,000 lb.

According to certain embodiments of the third aspect of the present invention, the compressive force is at least about 2,500 lb.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION

Figure 1:
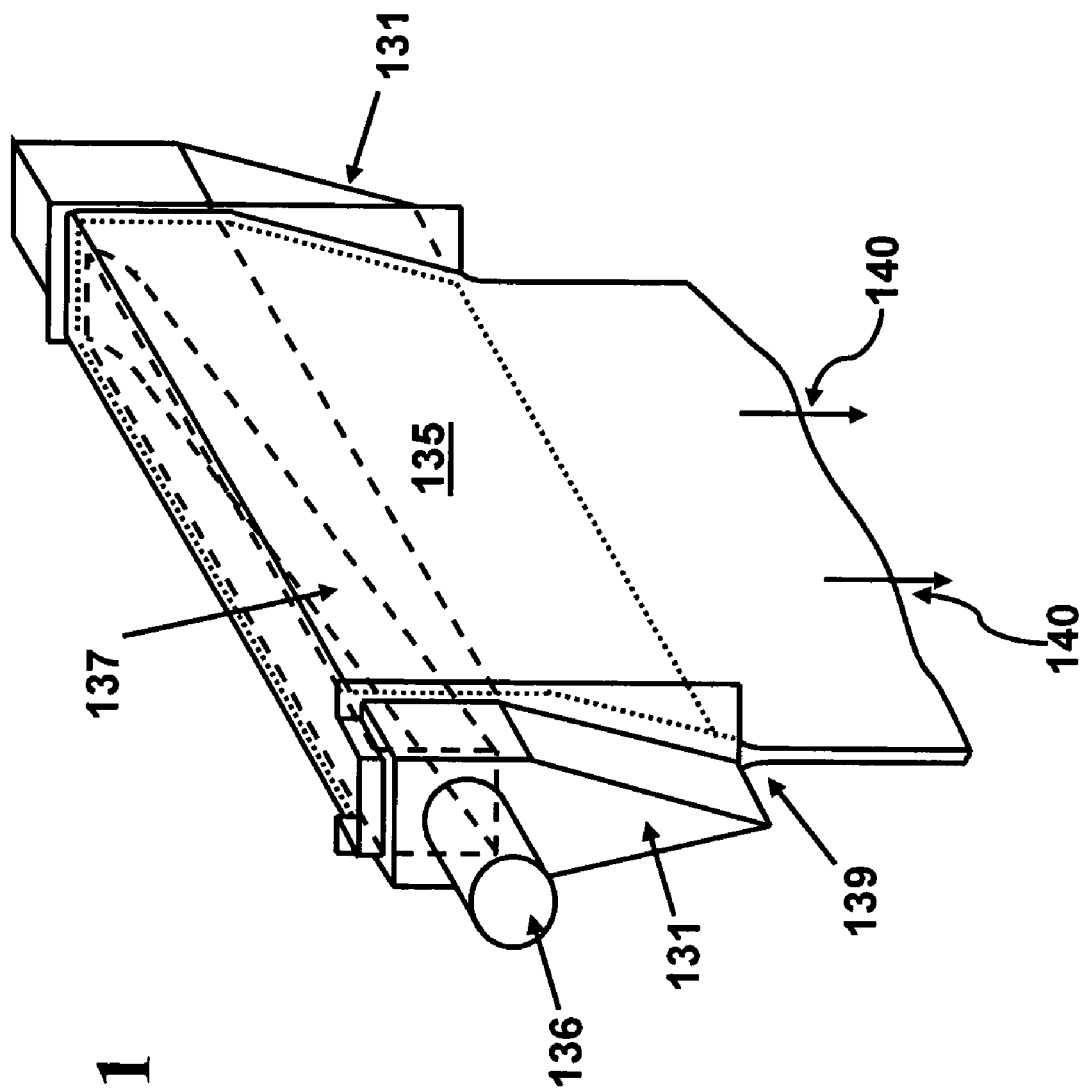
FIG. 1 is a schematic diagram illustrating a representative construction for an isopipe for use in an overflow downdraw fusion process for making sheet glass, in accordance with one aspect of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both aspects of the invention including and excluding the component.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, "creep" refers to the tendency of a material to move or to deform to relieve a stress. Creep of refractory materials can occur in various forms, such as Nabarro-Herring creep (stress driven bulk diffusion within grains) and/or Cobble creep (grain-boundary diffusion).

As used herein, "during manufacture" is intended to include both the period in which a drawn glass sheet is being produced, as well the preceding period during which the glass forming equipment and/or apparatus is assembled, prepared, and/or heated.

As used herein, the term "isopipe" refers to any sheet forming delivery system used in a fusion process which produces flat glass wherein at least a part of the delivery system comes into contact with the glass just prior to fusion, irrespective of the configuration or the number of components making up the delivery system.

As used herein, the term "delta temperature" or "ΔT" refers to the temperature difference between the root and the weir of an isopipe.

The following US Patents and published applications describe various compositions and methods for manufacturing sheet glass, and they are hereby incorporated by reference in their entirety and for the specific purpose of disclosing materials and methods relating to the formation of refractory ceramics, isopipes, and the manufacture of sheet glass: U.S. Patent Publication 2003/0121287; U.S. Patent Publication 2005/0120748; U.S. Patent Publication 2003/0192349; U.S. Pat. No. 3,338,696; U.S. Pat. No. 3,682,609; U.S. Pat. No. 6,974,786; and PCT Publication WO2005073137.

As briefly introduced above, the present invention provides methods for reducing the tensile stress on an isopipe, especially on an isopipe root, during heating and coupling. Such methods include heating profiles (a) in which a temperature hold is added to the end of an isopipe heating schedule, (b) in which the temperature difference between the weir and the root of an isopipe is reduced at the end of an isopipe heating schedule, and (c) in which a compressive force is applied to the ends of an isopipe during heating. An isopipe heated and used in accordance with the present invention can have enhanced dimensional stability and longevity compared to conventional methods. The various methods of the present invention can be utilized individually or in any combination to reduce the tensile stress on the root of an isopipe during heating.

Although the methods of the present invention are described below with respect to the heating of isopipes and the manufacture of sheet glass, it should be understood that the same or similar methods can be used in other applications requiring heating of refractory materials. Accordingly, the present invention should not be construed in a limited manner.

With reference to the drawings, FIG. 1 illustrates a schematic of an isopipe, typical of those used in the manufacture of sheet glass by, for example, the overflow downdraw fusion process. A conventional isopipe and sheet glass manufacturing system comprises a supply pipe 136 that provides molten glass to a collection trough 137 formed in a refractory body 135 known as an isopipe. During operation, molten glass can flow from the supply pipe to the trough where it can overflow the top of the trough of both sides, forming two sheets of glass that flow downward and then inward along the outer surfaces of the isopipe. The two sheets meet at the bottom or root 139 of the isopipe where they can fuse together into a single sheet. The single sheet is then fed to drawing equipment (represented by arrows 140), which controls the rate at which the sheet is drawn away from the root, and thus, the thickness of the sheet. The drawing equipment is typically positioned downstream of the root such that the formed sheet glass has sufficiently cooled and become rigid before contacting the equipment.

Figure 2:
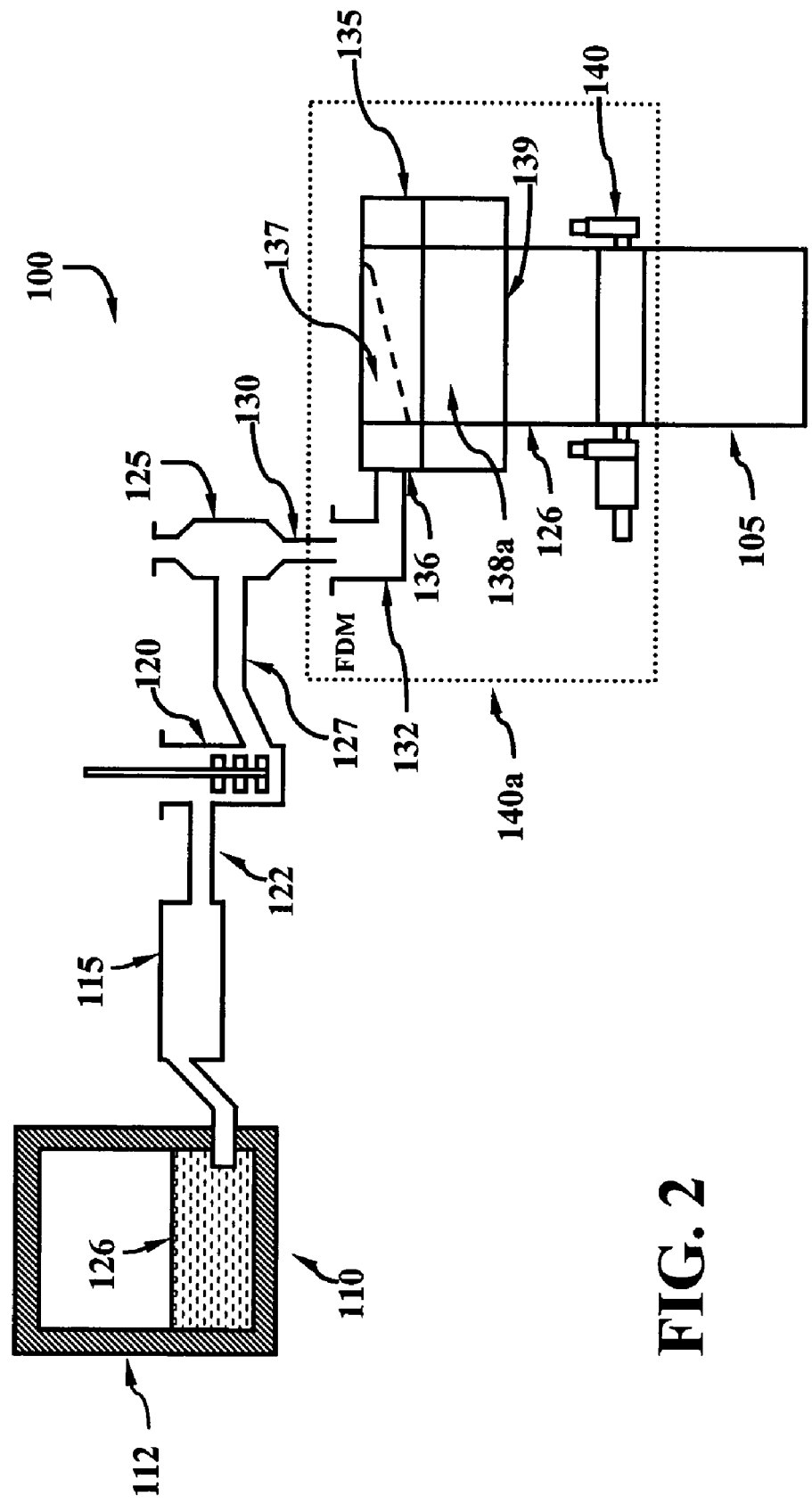
FIG. 2 is a schematic diagram illustrating a representative apparatus for sheet glass manufacture, in accordance with one aspect of the present invention.

FIG. 2 illustrates the balance of an exemplary glass manufacturing system 100 that uses the fusion process to make a glass sheet 105. The glass manufacturing system includes a melting vessel 110, a fining vessel 115, a mixing vessel 120 (e.g., stir chamber), a delivery vessel 125 (e.g., bowl), and a fusion draw machine (FDM) 140a. Glass materials are introduced into a melting vessel 110 as shown by arrow 112 and melted to form molten glass 126. The fining vessel 115 (e.g., finer tube) has a: high temperature processing area that receives the molten glass 126 (not shown at this point) from the melting vessel 110 and in which bubbles are removed from the molten glass 126. The fining vessel 115 is connected to the mixing vessel 120 (e.g., stir chamber) by a finer to stir chamber connecting tube 122. The mixing vessel 120 is connected to the delivery vessel 125 by a stir chamber to bowl connecting tube 127. The delivery vessel 125 delivers the molten glass 126 through a down-comer 130 into the FDM 140a which includes an inlet 132, an isopipe 135, and a pull roll assembly 140. As shown, the molten glass 126 from the down-comer 130 flows into an inlet 132 which leads to the isopipe 135. The isopipe 135 includes an opening 136 that receives the molten glass 126 which flows into a trough 137 and then overflows and runs down two sides 138a and 138b (not shown) before fusing together at the root 139. The root 139 is where the two sides 138a and 138b join together and where the two overflow walls of molten glass 126 rejoin (e.g., refuse) before being drawn downward by the pull roll assembly 140 to form the glass sheet 105.

An isopipe can be positioned in a muffle (not shown) that can include an input for receiving molten glass. A muffle, if present, can include insulation, heating elements, and air tubes to allow temperature control of various portions of the isopipe and/or glass manufacturing system. It should be noted that while certain details of an exemplary glass manufacturing system are described, isopipes and glass manufacturing systems are known in the art and one of skill in the art could readily select an appropriate isopipe and/or glass manufacturing system.

An isopipe used in the fusion process can be subjected to high temperatures and substantial mechanical loads as it is heated and molten glass flows into its trough and over its outer surfaces. To withstand these demanding conditions, the isopipe is typically made from an isostatically pressed block of a refractory material, such as, for example, a zircon refractory. To prevent damage from thermal stress, the initial heating of an isopipe from room temperature to operating temperatures, such as, for example, about 1,200° C., should be performed gradually and can take approximately a week or more. An exemplary heating schedule for a zircon isopipe is about 10° C./hr from room temperature to about 120° C., about 7° C./hr from about 120° C. to about 1,050° C., and about 5° C./hr from about 1,050° C. to about 1,280° C.

During heating and operation, various surfaces of an isopipe can exhibit differing temperatures. Typically, the weir (trough) will have a temperature that is, for example, about 10, 20, 40, 60, 80, 100, 120, or 150° C. greater than the temperature of the root. In the exemplary heating schedule described above, an isopipe can have a vertical temperature gradient (delta temperature) between the weir and the root of about 10° C. at about 1280° C., about 35° C. at about 800° C., about 60° C. at about 1,050° C., and about 150° C. at about 1,280° C.

Such delta temperatures can result in significant tensile stresses of up to 1,000 psi, 1,500 psi, 2,000 psi, or more at the isopipe root. Isopipes can vary in design and composition and, as such, the amount of tensile stress on an isopipe root created by a specific delta temperature can also vary. The maximum tolerable stress for a given isopipe can also vary based on design and composition and can be estimated by, for example, computer simulation, such as a finite element analysis. Computer software programs for determining the maximum tolerable stress of an isopipe are known (e.g., ANSYS, Inc., 275 Technology Drive, Canonsburg, Pa., USA) and one of skill in the art could readily select an appropriate software program.

The initial heating schedule for an isopipe is typically performed prior to connecting or coupling the isopipe to the down-comer or the balance of the glass manufacturing system. If the isopipe is positioned inside a muffle, the muffle door must be temporarily opened to allow coupling of the isopipe to the down-comer. During coupling, the root temperature of the isopipe can drop by, for example, as much as 60° C. over a short period of time (e.g., 3 hours), resulting in increased stress on the isopipe, such as, for example from about 1,600 psi to about 3,700 psi. The increase in stress due to coupling induced temperature changes alone can be greater than about 1,000 psi, 2,000 psi, 2,500 psi, or more, thus increasing the risk of structural failure.

An exemplary isostatically pressed zircon isopipe can typically survive a tensile stress of about 3,000 psi for about 100 hours over the temperature range of about 1,000° C. to about 1,100° C. Heating schedules and operating conditions should be designed such that the maximum tensile stress at the isopipe root is less than about 2,000 psi, preferably less than about 1,500 psi for any period longer than about 10 hours. Thus, the heating rates and vertical temperature gradients (ΔT) of an isopipe should be carefully controlled to prevent large stresses and structural failure, such as cracking, of the isopipe.

The present invention provides various approaches to reduce thermally induced tensile stress in an isopipe. Each of the approaches can be utilized individually or in combination with one or more other approaches. Details regarding heating schedules and/or application of compressive forces with respect to each approach are described below. In each approach and/or combination of approaches, the present invention is intended to cover aspects including the heating of an isopipe, coupling of an isopipe to a down-comer, and delivery of glass to the isopipe to form a drawn glass sheet.

Temperature Hold

The tensile stress on an isopipe root can be reduced if the heating schedule includes a temperature hold after the isopipe has reached a predetermined operating temperature, such as for example, from about 800° C. to about 1,200° C., and prior to coupling the isopipe to the down-comer. Such a temperature hold can provide time for the isopipe to relieve stress through creep of the refractory material prior to coupling to the down-comer. At the elevated temperature, the creep strain rate can be sufficient to relieve at least a portion of the thermally induced stress in the isopipe. A temperature hold can comprise maintaining the isopipe at the predetermined temperature for a period of time sufficient to relieve at least a portion of a tensile stress on the isopipe. The isopipe should be maintained at or near the predetermined temperature, such as, for example, ±150° C., ±100° C., or ±50° C. from the predetermined temperature, and all such aspects are intended to be included in the present invention.

The duration of a temperature hold can be any period of time sufficient to reduce at least a portion of the tensile stress on the isopipe root. As the isopipe design; isopipe composition, operating temperature, and heating schedule can vary, the length of time necessary to relieve at least a portion of the tensile stress can also vary. In various aspects, the duration of the temperature hold can be at least about 10, for example, about 10, 12, 14, 18, 20, 22, 25, 28, 30, 33, 35, or more hours; preferably at least about 20, for example, about 20, 22, 25, 28, 30, 33, 35 or more hours; more preferably at least about 30, for example, about 30, 31, 33, 35, 40, or more hours.

In one aspect, an isopipe is heated from room temperature to about 1,000° C. according to an established heating schedule. After reaching 1,000° C., the temperature of the isopipe is maintained at 1,000° C. for a period of about 20 hours.

In another aspect, an isopipe is heated from room temperature to about 1,000° C. according to an established heating schedule. After reaching 1,000° C., the temperature of the isopipe is maintained at 1,000° C. for a period of about 33 hours.

During the temperature hold, at least a portion of the tensile stress on the isopipe root can be relieved. Depending on the particular isopipe and heating schedule used, the tensile stress on the isopipe root can be reduced by up to, for example, 1,000 psi during the temperature hold. In various aspects, the tensile stress is reduced by about 500 psi, about 800 psi, or about 1,000 psi during the temperature hold. The tensile stress remaining at the end of the temperature hold and prior to coupling can vary depending upon the isopipe, the tensile stress present prior to the temperature hold, the operating temperature, and the duration of the temperature hold. In various exemplary aspects, the tensile stress remaining on the isopipe root at the end of the temperature hold is less than about 1,500 psi, for example, about 1,400, 1,200, 1,000, 800, 600, 400, or 200 psi; less than about 1,000 psi, for example, about 900, 700, 500, or 300 psi; or less than about 800 psi, for example, about 700, 600, 500, 400, 300, or 200 psi.

One of skill in the art could readily design an isopipe heating schedule that incorporates a temperature hold prior to coupling.

Reduction in Delta Temperature Prior to Coupling

Another approach to reducing tensile stress on an isopipe root is to reduce the temperature difference between the weir and the root of an isopipe at the end of the heating schedule. Such a reduction in the temperature difference between the weir and the root of an isopipe, or ΔT, can result in decreased tensile stress on the isopipe root.

In a conventional arrangement, an isopipe is disposed inside a muffle. The muffle can insulate the isopipe and surrounding components and can comprise heaters and/or cooling tubes to allow temperature control of various portions of the isopipe. When the isopipe is coupled to the down-comer, at least one opening is made in the muffle to facilitate joining of the components. Such an opening can allow ambient air to enter the muffle and/or create convective air currents that can cool at least a portion of the isopipe, resulting in stress.

A reduction in ΔT at the end of the heating schedule can be achieved by, for example, modifying the heating schedule and/or reducing the exposure time of the isopipe to ambient air or convective air currents. In one aspect, the isopipe exposure time is reduced by utilizing a fast coupling process that does not allow the isopipe to cool significantly. A quick coupling process, in accordance with the present invention, can take about 3 hours, about 2 hours, about 1 hour, about 30 minutes or less.

If other components, such as, for example, an auxiliary heater, are positioned within the muffle or adjacent to the isopipe, adjustment and/or removal of such components prior to coupling can also result in exposure of the isopipe to ambient air or convective air currents similar to those described above.

The heating schedule of an isopipe can also be adjusted to reduce ΔT at the end of the heating schedule. In an exemplary heating schedule, the target temperature of the root can be about 1,160° C. and the target temperature of the weir can be about 1,250° C. (ΔT=90° C.). Higher temperature differences can result during the coupling process. A heating schedule designed in accordance with the present invention can provide ΔT values of less than about 100° C., preferably less than about 75° C.

One of skill in the art could readily select an appropriate heating schedule and/or coupling method to reduce ΔT, in accordance with various aspects of the present invention.

Compressive Force Applied During Heating

Figure 6:
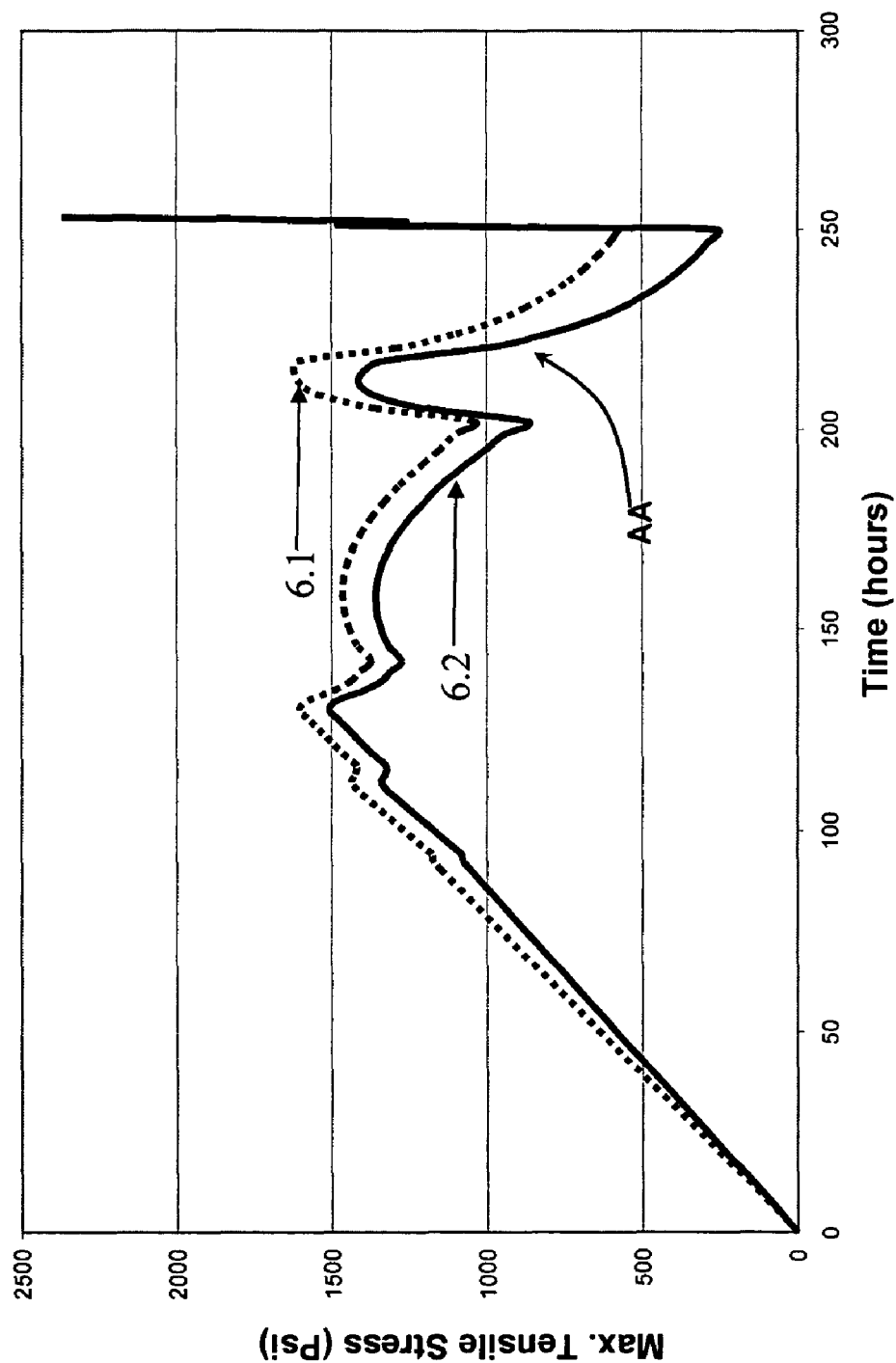
FIG. 6 depicts tensile stress values achievable by increasing the compressive force applied to isopipe root during heating, in accordance with one aspect of the present invention.

Another approach to reducing tensile stress on an isopipe root is the application of a compressive force to, for example, the ends 131 of the isopipe root during heating. The compressive force can be any force that applies a stress sufficient to offset at least a portion of the thermally induced tensile stress in the isopipe. A compressive force can be applied to, for example, the ends of the isopipe root during the heating schedule. In addition to reducing tensile stress in the isopipe, a compressive force applied to the ends of the isopipe can also accelerate creep of the refractory material and thus, provide further stress relief (FIG. 6).

Compression of isopipes during operation (e.g., sheet glass fabrication) can be used to create a moment opposite to that created by gravity, thus preventing sag of an isopipe due to creep of the refractory material. In contrast, the present invention utilizes a compressive force applied to the isopipe root during the heating schedule to create a counter-stress to the thermally induced tensile stress. The amount of force applied to the isopipe root can vary, depending on the isopipe design and composition and the specific heating schedule employed. In one aspect, the force can be from about 100 lbs to about 7,000 lbs, for example, about 100, 300, 700, 1,000, 2,000, 4,000, 5,000, 6,000, or 7,000 lbs. A higher applied force can more effectively counter the heating induced stresses of the isopipe, provided that the applied force itself does not induce structural failure.

In one aspect, a 1,000 lb compressive force is applied to the ends of an isopipe root during heating. In another aspect, a 5,800 lb compressive force is applied to the ends of an isopipe root during heating. The pressure exerted by such a compressive force can vary, depending on the area over which the force is applied, and it is not necessary that the force be distributed uniformly across the root or end of the root. In one aspect, a 5,800 lb. force is applied over an area of approximately 27.1 square inches, resulting in an average pressure of about 214 psi. This pressure should be distinguished from the amount of stress on the isopipe, which can also be expressed in psi.

The amount of stress that can be mitigated by application of a compressive force can vary, and the remaining tensile stress on the isopipe after heating and application of a compressive force can be, for example, from about 100 psi to about 4,000 psi, preferably from about 100 psi to about 2500 psi, and more preferably from about 100 psi to about 1,000 psi.

One of skill in the art could determine a suitable compressive force to apply to an isopipe during heating to reduce thermally induced tensile stress in accordance with the present invention.

The various approaches described herein can be used individually, or in any combination, to reduce stress on an isopipe. In various aspects, a temperature hold is combined with a modified heating schedule that reduces ΔT, a temperature hold is combined with the application of a compressive force to the isopipe root, a modified heating schedule that reduces ΔT is combined with the application of a compressive force to the isopipe root, and a temperature hold is combined with both a modified heating schedule that reduces ΔT and the application of a compressive force to the isopipe root.

Although several aspects of the present invention have been illustrated in the accompanying drawings and described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions. All of the examples represent modeled data.

Example 1

Typical Heat-Up and Coupling Process

Figure 3:
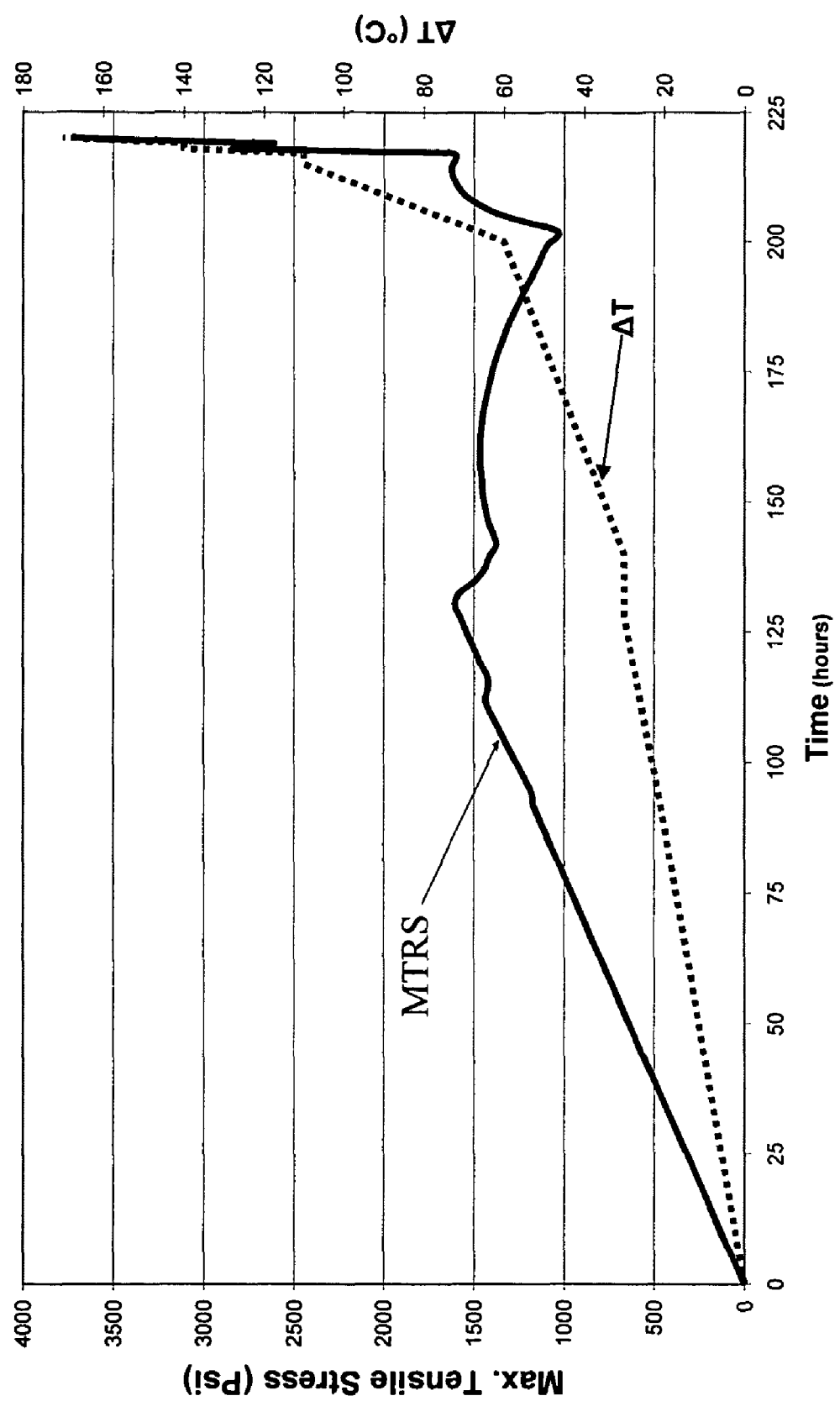
FIG. 3 depicts typical values for tensile stress and delta temperature during conventional heating and coupling of an isopipe.

In a first example, a zircon isopipe subjected to a typical heating schedule, as illustrated in FIG. 3, is modeled. In this figure, MRTS means maximal root tensile stress. As the isopipe is heated and the temperature difference between the weir and the root increases, the tensile stress on the isopipe root also increases to about 1,600 psi. At the end of the heating schedule, the isopipe is coupled to the down-comer, resulting in a temperature drop at the root of about 60° C. This quick temperature change results in an increase in the root tensile stress of about 2,100 psi (i.e., from about 1,600 psi to about 3,700 psi).

Example 2

Incorporation of a Temperature Hold

Figure 4:
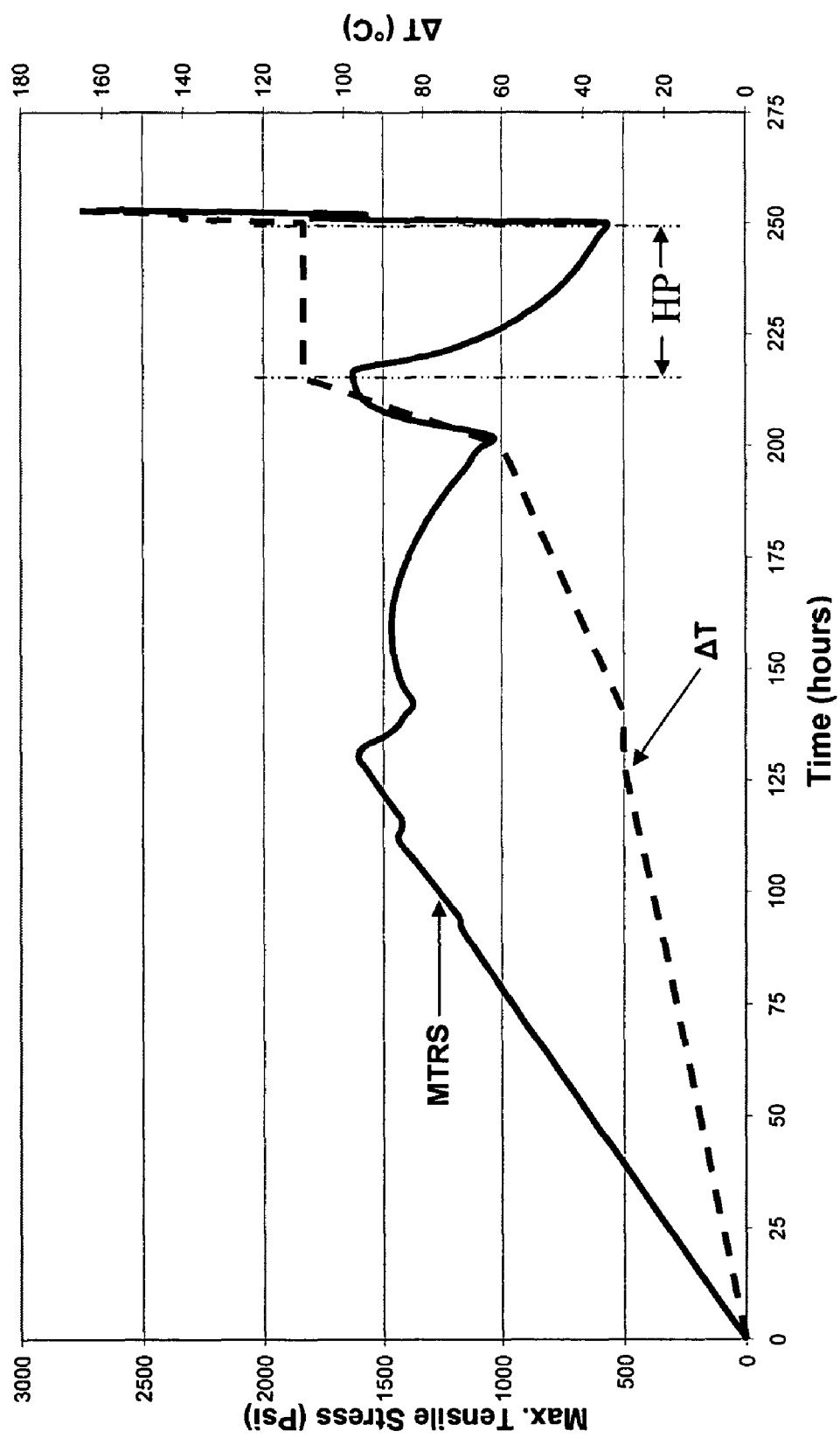
FIG. 4 depicts tensile stress values achievable by incorporation of a temperature hold time at the end of an isopipe heating schedule, in accordance with one aspect of the present invention.

In a second example, a zircon isopipe initially heated as in Example 1 is modeled, but prior to coupling the isopipe to the down-comer, the temperature is maintained for a period of 33 hours (FIG. 4, period shown as "HP"). While the temperature difference between the weir and the root is not significantly different from the heating schedule of Example 1, the maximum tensile stress on the isopipe, during coupling, is approximately 2,600 psi when a temperature hold is used, compared to 3,700 psi in the absence of a temperature hold.

Example 3

Reduction of Delta Temperature Prior to Coupling

Figure 5:
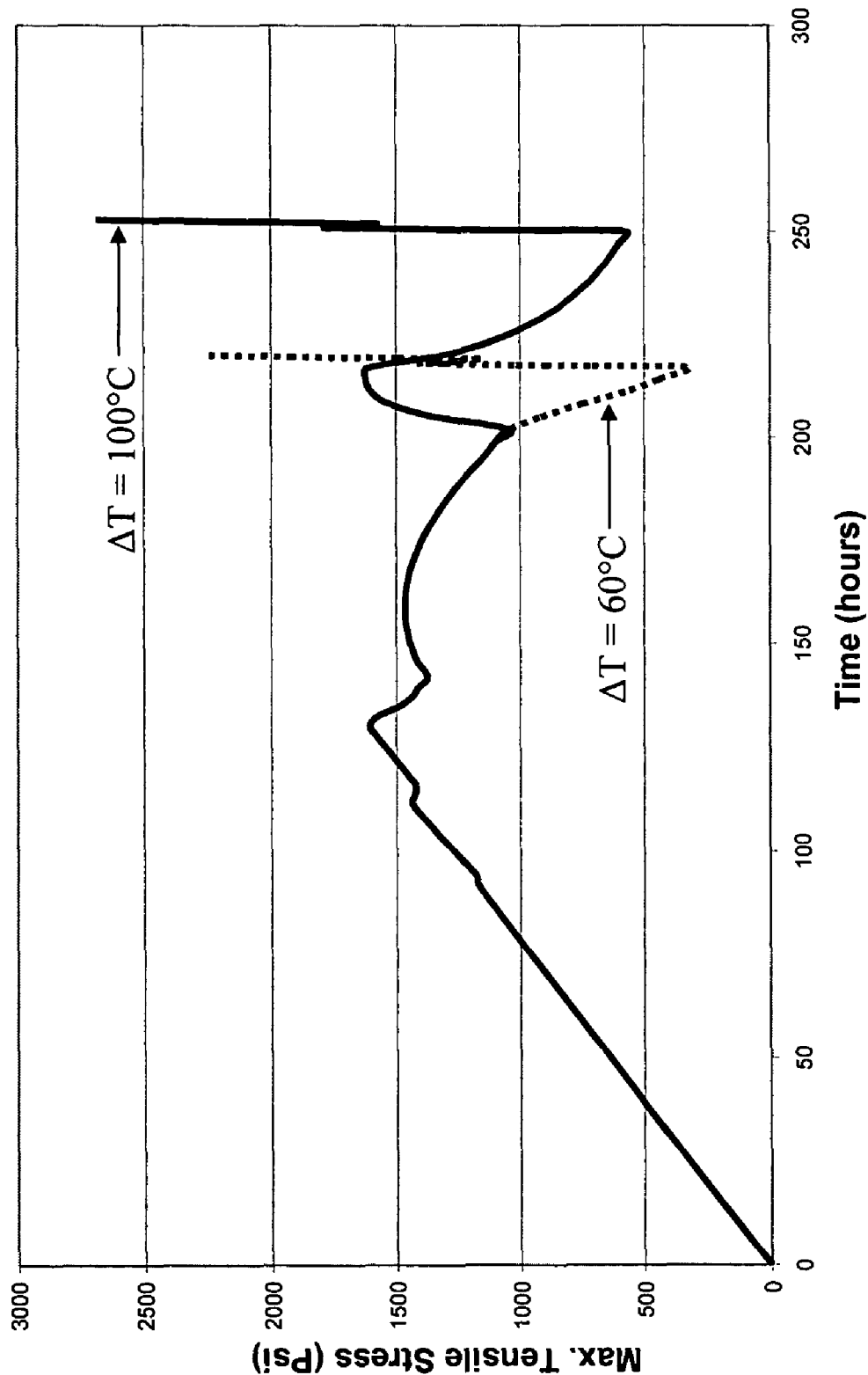
FIG. 5 depicts tensile stress values achievable by reducing the delta temperature at the end of an isopipe heating schedule, in accordance with one aspect of the present invention.

In a third example, a zircon isopipe initially heated as in Example 1 is modeled, but the heating schedule is modified such that the temperature difference between the weir and the root at the end of the heating schedule and prior to coupling is reduced to 60° C. FIG. 5 illustrates the difference in maximum root tensile stress between this heating schedule and the heating schedule presented in Example 2 (with 33 hour temperature hold). The tensile stress at the end of the modified heating schedule and prior to coupling is less than 500 psi.

Example 4

Application of a Compressive Force During Heating

In a fourth example, a zircon isopipe heated as in Example 1 is modeled, except that a 5,800 lb. compressive force is applied to the ends of the isopipe root during heating. FIG. 6 illustrates the difference in tensile stress resulting from the use of a 5,800 lb compressive force (curve 6.2) and a smaller 1,000 lb force (curve 6.1). Both samples also include a 33 hour temperature hold at the end of the heating schedule, as described in Example 2. The maximum tensile stress, both prior to and during coupling, is significantly reduced as compared to a conventional heating schedule. The accelerated refractory creep rate resulting from the larger (5,800 lb) compressive force allows greater stress relief during the holding period than can be achieved with a smaller compressive force (1,000 lb) (shown in area AA in FIG. 6). The tensile stress on the isopipe, after heating under a compressive force of 5,800 lb. and prior to coupling is less than 500 psi.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method for reducing stress on an isopipe during manufacture of a drawn glass sheet, the method comprising:
   a) providing an isopipe having a weir and a root;
   b) positioning the isopipe within a muffle of a sheet glass manufacturing system;
   c) heating the isopipe to a predetermined temperature wherein the predetermined temperature is from about 800° C. to about 1,250° C.;
   d) maintaining the isopipe at the predetermined temperature for a period of time sufficient to relieve at least a portion of a tensile stress on the isopipe root wherein the period of time is at least about 10 hours;
   e) after step d), coupling the isopipe to a down-comer; and
   f) after step e), providing glass to the isopipe.

2. The method of claim 1, wherein the period of time is at least about 20 hours.

3. The method of claim 1, wherein the period of time is at least about 30 hours.

4. The method of claim 1, wherein the tensile stress is after the period of time is less than about 1,000 psi.

5. The method of claim 1, wherein the tensile stress after the period of time is at least about 500 psi less than the tensile stress prior to the period of time.

6. The method of claim 1, wherein the tensile stress after the period of time is at least about 800 psi less than the tensile stress prior to the period of time.

7. The method of claim 1, wherein a compressive force is applied to the isopipe root at least during step b).

8. The method of claim 7, wherein after step c) and prior to step d), the weir and the root have a temperature difference of less that about 100° C.

9. The method of claim 1, wherein a compressive force is applied to the isopipe root at least during step c).

10. The method of claim 9, wherein after step c), and prior to step d), the weir and the root have a temperature difference of less than about 100° C.

11. The method of claim 1, wherein after step c) and prior to step d), the weir and the root have a temperature difference of less than about 100° C.

12. A method for reducing stress on an isopipe during manufacture of a drawn glass sheet, the method comprising:
   a) providing an isopipe having a weir and a root;
   b) positioning the isopipe within a muffle of a sheet glass manufacturing system;
   c) heating the isopipe to a predetermined temperature wherein the predetermined temperature is from about 800° C. to about 1,250° C.;
   d) after step c), coupling the isopipe to a down-comer; and
   e) after step d), providing glass to the isopipe;
   wherein after heating and prior to coupling, the weir and the root have a temperature difference of less than about 100° C.

13. The method of claim 12, wherein after heating, the weir and the root have a temperature difference of less than about 75° C.

14. The method of claim 12, wherein a compressive force is applied to the isopipe root at least during step b).

15. The method of claim 12, wherein after step b) and before step c), further comprising the step of maintaining the isopipe at the predetermined temperature for a period of time sufficient to relieve at least a portion of a stress on the isopipe.

16. A method for reducing stress on an isopipe during manufacture of a drawn glass sheet, the method comprising:
   a) providing an isopipe having a weir and a root;
   b) positioning the isopipe within a muffle of a sheet glass manufacturing system;
   c) heating the isopipe to a predetermined temperature wherein the predetermined temperature is from about 800° C. to about 1,250° C.;
   d) after step c), coupling the isopipe to a down-comer; and
   e) after step d), providing glass to the isopipe;
   wherein during heating and prior to coupling, a compressive force sufficient to relieve at least a portion of a tensile stress on the isopipe is applied to the root, and
   wherein after step c) and before step d), further comprising the step of maintaining the isopipe at the predetermined temperature for a period of time sufficient to relieve at least a portion of the tensile stress on the isopipe wherein the period of time is at least about 10 hours.

17. The method of claim 16, wherein the compressive force is less than about 1,000 lb.

18. The method of claim 16, wherein the compressive force is at least about 2,500 lb.

* * * * *